(12) United States Patent
Yu et al.

(10) Patent No.: US 10,319,172 B2
(45) Date of Patent: Jun. 11, 2019

(54) BANKNOTE CRACK DETECTION METHOD AND APPARATUS

(71) Applicant: GRG Banking Equipment Co., Ltd., Guangzhou, Guangdong (CN)

(72) Inventors: Yuanchao Yu, Guangdong (CN); Rongqiu Wang, Guangdong (CN); Zhanfeng Huang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/543,551

(22) PCT Filed: Jul. 13, 2015

(86) PCT No.: PCT/CN2015/083862
§ 371 (c)(1),
(2) Date: Jul. 13, 2017

(87) PCT Pub. No.: WO2016/119410
PCT Pub. Date: Aug. 4, 2016

(65) Prior Publication Data
US 2018/0025571 A1    Jan. 25, 2018

(30) Foreign Application Priority Data
Jan. 26, 2015   (CN) .......................... 2015 1 0038608

(51) Int. Cl.
*G06T 7/00* (2017.01)
*G06T 7/11* (2017.01)
(Continued)

(52) U.S. Cl.
CPC .............. *G07D 11/237* (2019.01); *G06T 7/00* (2013.01); *G06T 7/0002* (2013.01);
(Continued)

(58) Field of Classification Search
CPC ... G06T 7/0002; G06T 7/0004; G06T 7/0008; G06T 7/11; G06T 7/10; G06T 7/136;
(Continued)

(56) References Cited

U.S. PATENT DOCUMENTS 6,061,121 A    5/2000   Holl et al.
2002/0049674 A1*   4/2002   Tamamoto ........... G06Q 20/108
                                                      705/43

(Continued)

FOREIGN PATENT DOCUMENTS

CN        101833815 A     9/2010
CN        102236897 A    11/2011
(Continued)

OTHER PUBLICATIONS

International Search Report for Application No. PCT/CN2015/083862 dated Sep. 24, 2015.
(Continued)

*Primary Examiner* — Geoffrey E Summers
(74) *Attorney, Agent, or Firm* — Wolf, Greenfield & Sacks, P.C.

(57) ABSTRACT

A banknote crack detection method and a banknote crack detection apparatus are provided. The banknote crack detection apparatus includes an image collection unit, configured to collect an optical transmission image of an inputted banknote, a pre-processing unit, configured to receive a banknote image signal collected by the image collection unit, and perform foreground region positioning and cutting on the banknote image signal; a crack detection unit, configured to detect whether a crack exists; and a determining unit, configured to determine whether the banknote is qualified according to a detection result of the crack detection unit; and a control unit, configured to control operation of each of the above units.

2 Claims, 5 Drawing Sheets

(51) Int. Cl.
*G06T 7/187* (2017.01)
*G07D 11/00* (2019.01)
*G07D 7/181* (2016.01)
*G07D 11/237* (2019.01)

(52) U.S. Cl.
CPC .............. *G06T 7/0004* (2013.01); *G06T 7/11* (2017.01); *G06T 7/187* (2017.01); *G07D 7/181* (2017.05); *G07D 11/009* (2013.01)

(58) Field of Classification Search
CPC ......... G06T 7/181; G06T 7/187; G06T 7/194; G06T 7/00; G07D 7/00; G07D 7/12; G07D 7/121; G07D 7/181; G07D 7/189; G07D 7/185; G07D 11/0039; G07D 11/009; G07D 11/237
USPC .................................. 382/135, 137; 209/534
See application file for complete search history.

(56) References Cited

U.S. PATENT DOCUMENTS

| | | | |
|---|---|---|---|
| 2003/0019715 A1* | 1/2003 | Yoshida | G07D 7/20 194/206 |
| 2007/0122023 A1* | 5/2007 | Jenrick | G07D 7/162 382/135 |
| 2007/0258621 A1 | 11/2007 | Kato et al. | |
| 2008/0273789 A1 | 11/2008 | Bell et al. | |
| 2013/0287264 A1* | 10/2013 | Chen | G07D 7/2016 382/112 |
| 2016/0121370 A1 | 5/2016 | Liang et al. | |

FOREIGN PATENT DOCUMENTS

| | | |
|---|---|---|
| CN | 103177503 A | 6/2013 |
| CN | 103324946 A | 9/2013 |
| CN | 103377509 A | 10/2013 |
| CN | 203950377 U | 11/2014 |
| CN | 104504727 A | 4/2015 |
| DE | 10242398 B4 | 3/2007 |
| DE | 10 2012 223472 A1 | 6/2014 |
| JP | 2010-117803 A | 5/2010 |
| RU | 2 169 393 C2 | 6/2001 |
| SU | 1575210 A1 | 6/1990 |
| WO | WO 2014/095615 A1 | 6/2014 |

OTHER PUBLICATIONS

Written Opinion of the International Searching Authority for Application No. PCT/CN2015/083862 dated Sep. 24, 2015.
Extended European Search Report for Application No. 15879610.2 dated Dec. 19, 2017.
Russian 1st Office Action dated Aug. 9, 2018 in connection with Application No. 2017129563/08.

* cited by examiner

BANKNOTE CRACK DETECTION METHOD AND APPARATUS

The present application is the national phase of International Patent Application No. PCT/CN2015/083862, titled "BANKNOTE CRACK DETECTION METHOD AND APPARATUS", filed on Jul. 13, 2015, which claims priority to Chinese Patent Application No. 201510038608.8, titled "BANKNOTE CRACK DETECTION METHOD AND APPARATUS", filed with the State Intellectual Property Office of the People's Republic of China on Jan. 26, 2015, both of which applications are incorporated herein by reference in their entireties.

TECHNICAL FIELD

The present disclosure relates to the field of image processing, and in particular to a banknote crack detection method and a banknote crack detection apparatus.

BACKGROUND

Banknote processing technology plays a more and more important role in an extensive application of financial self-service equipment, such as ATM machine. Banknote processing technology is no longer limited to basic currency denomination recognition and authentication. In particular, since cash recycling technology has been applied, the detection of circulation ability of banknote becomes more and more important. On one hand, a banknote having a poor condition is easy to be damaged and is not suitable to be circulated in the market. On the other hand, a banknote having a poor condition readily causes failure of self-service equipment, such as banknote overlapping, banknote connection and banknote jam. In the detection of circulation ability of banknote, a detection for banknote crack is recognized as a hard problem in the industry. A banknote crack is usually one or multiple cracks on the banknote face due to tearing, folding, or cutting. If there is a banknote with cracks in self-service equipment, such as an ATM machine, in a process of trading, the banknote likely causes banknote jam when the banknote is conveyed in a channel of the self-service equipment. Once the failure of banknote jam occurs, the service of the equipment has to be stopped until the banknote is cleared by a professional person, which has a serious impact on transactions for the customer. Therefore, it is critical to effectively detect whether there is a crack on the banknote and determine whether the crack is serious enough to cause the failure of banknote jam. Thus, it is necessary to solve the problem of banknote crack detection in the industry.

SUMMARY

In order to solve the problem of banknote crack detection in the conventional art, the present disclosure provides a banknote crack detection apparatus and a banknote crack detection method, for accurately detecting whether there is a crack on a banknote, calculating a crack length and a crack depth of a banknote, providing a criterion for determining a damage degree of a banknote, thereby rejecting a banknote with serious cracks, and avoiding a problem of banknote jam caused by banknote cracks.

The banknote crack detection apparatus includes: an image collection unit, configured to collect an optical transmission image of an inputted banknote; a pre-processing unit, configured to receive a banknote image signal collected by the image collection unit, and perform foreground region positioning and cutting on the banknote image signal; a crack detection unit, configured to receive a banknote foreground region image from the pre-processing unit, determine whether there is a pixel segment with a crack feature at an edge of a foreground region, determine that there is a crack at the edge of the foreground region if there is the pixel segment with the crack feature, detect whether the crack is extended to a deeper row or column than the edge in the manner of detecting whether there is a crack at an edge, and accumulate a crack edge length and a crack depth; a determining unit, configured to determine whether the inputted banknote is qualified according to a detection result of the crack detection unit, where a determining rule is that if there is no crack at any of four edges of the inputted banknote, the inputted banknote is qualified and received, if the inputted banknote has an edge, and the crack edge length is greater than a preset threshold or the crack depth is greater than the preset threshold, the inputted banknote is unqualified and rejected, and if the inputted banknote has an edge, and the crack edge length is less than the preset threshold and the crack depth is less than the preset threshold, the inputted banknote is qualified and received; and a control unit, configured to control operation of each of the above units.

Specifically, the pixel segment with the crack feature is an adjacent pixel segment with a certain step, a gray level of each pixel in the pixel segment exceeds a preset gray level threshold, and pixel gray gradients at two end points of the pixel segment both exceeds a preset gradient threshold.

The present disclosure also provides a banknote crack detection method, including: step 1, inputting a to-be-detected banknote to start a process; step 2, collecting an optical transmission image of the inputted banknote; step 3, detecting and cutting a foreground region of the inputted banknote, and then placing the foreground region in a pixel coordinate system; step 4, determining whether there is a crack at an edge of the foreground region, turning to step 5 if there is a crack, otherwise, turning to step 8; step 5, accumulating a crack edge length CL and a crack depth CH; step 6, determining whether the crack edge length CL is greater than a preset threshold and whether the crack depth CH is greater than the preset threshold, turning to step 7 if the crack edge length CL is greater than the preset threshold or the crack depth CH is greater than the preset threshold, otherwise, turning to step 8; step 7, determining that the inputted banknote has a crack, rejecting the inputted banknote, and ending the process; and step 8, receiving the inputted banknote, and ending the process.

Preferably, in step 4, the determining whether there is a crack at an edge of the foreground region includes: sequentially determining, for each of adjacent pixel segments of a certain step at upper, lower, left and right edges, whether a gray level of each pixel in the pixel segment exceeds a preset gray level threshold, and whether pixel gray gradients at two end points of the pixel segments both exceeds a preset gradient threshold, and determining that there is a crack at the edges of the foreground region if the gray level of each pixel in the pixel segment exceeds the preset gray level threshold, and the pixel gray gradients at two end points of the pixel segments both exceed the preset gradient threshold, otherwise, determining there is no crack at the edges of the foreground region.

Preferably, in step 5, the accumulating a crack edge length CL and a crack depth CH includes: detecting whether the crack is extended to a deeper row or column than the edge in the same manner of detecting whether there is a crack at the edge of the foreground region, continuing to accumulate the crack edge length CL and the crack depth CH in a case that the crack is extended, continuing to perform the accumulation on a deeper row or column until meeting a row or column to which the crack is not extended, to obtain the accumulated crack edge length CL and the accumulated crack depth CH.

Preferably, a method of detecting a crack at the edge of the foreground region includes steps 51 to 55.

In step 51, an initialization setting is performed to set a starting edge point of the crack as $P_S$, an end edge point of the crack as $P_E$, a crack width as Cw=0, a crack edge length as Cl=0, and a crack depth as Ch=0.

In step 52, a crack starting edge point and a crack end edge point in pixels in an edge of the foreground region are searched for. If points $P(x_{01}, y_{01})$ and $P(x_{02}, y_{01})$ meet:

$$\begin{cases} x_{02} - x_{01} - 1 <= 2 \\ GrayP(x_{01}, y_{01}) < gth \max \\ GrayP(x_{02}, y_{01}) < gth \max \\ GrayP_M > gth \min \end{cases} \quad \text{(formula 3)}$$

$P_S=P(x_{01}, y_{01})$, $P_E=P(x_{02}, y_{01})$, CL=Cl+2 and CH=Ch+1 are updated. $x_{02}-x_{01}-1<=2$ indicates that a width of the crack region on the foreground region image is no more than 2 pixels. gth max denotes a maximum gray value of an optical transmission image when there is no crack in medium, and is generally set to 200. gth min denotes a minimum gray value of the crack region in the optical transmission image, and is generally set to 250. $P_M$ denotes a point between $P(x_{01}, y_{01})$ and $P(x_{02}, y_{01})$.

In step 53, when Cw=1, that is there is one pixel point between $P(x_{01}, y_{01})$ and $P(x_{02}, y_{01})$, it is determined that $$\begin{cases} x_{02} = x_{01} + 2 \\ GrayP(x_{01} - 1, y_{01} + 1) < gth \max \\ GrayP(x_{02} + 1, y_{01} + 1) < gth \max \end{cases} \quad \text{(formula 4)}$$

(1) If $$\begin{cases} GrayP(x_{01}, y_{01} + 1) > gth \min \\ GrayP(x_{01} + 1, y_{01} + 1) < gth \max \end{cases} \quad \text{(formula 5)}$$

then for the crack in the line, the starting point is updated to $P_S=P(x_{01}-1, y_{01}+1)$, the end point is updated to $P_E=P(x_{01}+1, y_{01}+1)$, the crack edge length is updated to CL=Cl+2, the crack depth is updated to CH=Ch+1, the crack width is updated to Cw=1.

(2) If $$\begin{cases} GrayP(x_{02}, y_{01} + 1) > gth \min \\ GrayP(x_{01} + 1, y_{01} + 1) < gth \max \end{cases} \quad \text{(formula 6)}$$

then for the crack in the line, the starting point is updated to $P_S=P(x_{01}+1, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=1.

(3) If $$\begin{cases} GrayP(x_{01}, y_{01} + 1) > gth \min \\ GrayP(x_{01} + 1, y_{01} + 1) > gth \min \\ GrayP(x_{02}, y_{01} + 1) < gth \max \end{cases} \quad \text{(formula 7)}$$

then for the crack in the line, the starting point is updated to $P_S=P(x_{01}-1, y_{01}+1)$, the end point is updated to $P_E=P(x_{02}, y_{01}+1)$, the crack edge length is updated to CL=Cl+2, the crack depth is updated to CH=Ch+1, the crack width is updated to Cw=2.

(4) If $$\begin{cases} GrayP(x_{01}, y_{01} + 1) < gth \max \\ GrayP(x_{01} + 1, y_{01} + 1) > gth \min \\ GrayP(x_{02}, y_{01} + 1) > gth \min \end{cases} \quad \text{(formula 8)}$$

then for the crack in the line, the starting point is updated to $P_S=P(x_{01}, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=2.

In step 54, when Cw=2, that is there are two pixels between $P_S$ and $P_E$, it is determined that $$\begin{cases} x_{02} = x_{01} + 3 \\ GrayP(x_{01} - 1, y_{01} + 1) < gth \max \\ GrayP(x_{02} + 1, y_{01} + 1) < gth \max \end{cases} \quad \text{(formula 9)}$$

(1) If $$\begin{cases} GrayP(x_{01}, y_{01} + 1) > gth \min \\ GrayP(x_{01} + 1, y_{01} + 1) < gth \max \end{cases} \quad \text{(formula 10)}$$

then for the crack in the line, the starting point is updated to $P_S=P(x_{01}-1, y_{01}+1)$, the end point is updated to $P_E=P(x_{01}+1, y_{01}+1)$, the crack edge length is updated to CL=Cl+2, the crack depth is updated to CH=Ch+1, the crack width is updated to Cw=1.

(2) If $$\begin{cases} GrayP(x_{01}, y_{01} + 1) < gth \max \\ GrayP(x_{01} + 1, y_{01} + 1) > gth \min \\ GrayP(x_{01} + 2, y_{01} + 1) < gth \max \end{cases} \quad \text{(formula 11)}$$

then for the crack in the line, the starting point is updated to $P_S=P(x_{01}, y_{01}+1)$, the end point is updated to $P_E=P(x_{01}+2, y_{01}+1)$, the crack edge length is updated to CL=Cl+2, the crack depth is updated to CH=Ch+1, the crack width is updated to Cw=1.

(3) If $$\begin{cases} GrayP(x_{01} + 1, y_{01} + 1) < gth \max \\ GrayP(x_{01} + 2, y_{01} + 1) > gth \min \\ GrayP(x_{01} + 3, y_{01} + 1) < gth \max \end{cases} \quad \text{(formula 12)}$$

then for the crack in the line, the starting point is updated to $P_S=P(x_{01}+1, y_{01}+1)$, the end point is updated to $P_E=P(x_{01}+3,$ $y_{01}+1$), the crack edge length is updated to CL=Cl+2, the crack depth is updated to CH=Ch+1, the crack width is updated to Cw=1.

(4) If $$\begin{cases} GrayP(x_{01}+2, y_{01}+1) < gth\,\max \\ GrayP(x_{02}, y_{01}+1) > gth\,\min \end{cases}, \quad \text{(formula 13)}$$

then for the crack in the line, the starting point is updated to $P_S=P(x_{01}+2, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=1.

(5) If $$\begin{cases} GrayP(x_{01}, y_{01}+1) > gth\,\min \\ GrayP(x_{01}+1, y_{01}+1) > gth\,\min \\ GrayP(x_{01}+2, y_{01}+1) < gth\,\max \end{cases}, \quad \text{(formula 14)}$$

then for the crack in the line, the starting point is updated to $P_S=P(x_{01}-1, y_{01}+1)$, the end point is updated to $P_E=P(x_{01}+2, y_{01}+1)$, the crack edge length is updated to CL=Cl+2, the crack depth is updated to CH=Ch+1, the crack width is updated to Cw=2.

(6) If $$\begin{cases} GrayP(x_{01}, y_{01}+1) < gth\,\max \\ GrayP(x_{01}+1, y_{01}+1) > gth\,\min \\ GrayP(x_{01}+2, y_{01}+1) > gth\,\min \\ GrayP(x_{01}+3, y_{01}+1) < gth\,\max \end{cases}, \quad \text{(formula 15)}$$

then for the crack in the line, the starting point is updated to $P_S=P(x_{01}, y_{01}+1)$, the end point is updated to $P_E=P(x_{01}+3, y_{01}+1)$, the crack edge length is updated to CL=Cl+2, the crack depth is updated to CH=Ch+1, the crack width is updated to Cw=2.

(7) If $$\begin{cases} GrayP(x_{01}+1, y_{01}+1) < gth\,\max \\ GrayP(x_{01}+2, y_{01}+1) > gth\,\min \\ GrayP(x_{01}+3, y_{01}+1) > gth\,\min \end{cases}, \quad \text{(formula 16)}$$

then for the crack in the line, the starting point is updated to $P_S=P(x_{01}+1, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=2.

In other cases, the crack does not extend to the line and the crack detection ends.

In step 55, an iterative computation is performed. If Cw=1, step 53 is performed repeatedly, and if Cw=2, step 54 is performed repeatedly, until a complete detection for a crack is finished.

The banknote crack detection method according to the present disclosure is based on an imaging principle of a banknote optical transmission image. The gray level of the banknote transmission image is closely related to an intensity of a sensor light source and light transmittance of the banknote. In a case that the intensity of the light source is constant, there is a huge difference between a transmittance of a crack region and a transmittance of a non-crack region. Furthermore, image gray levels in the crack region are the same, and thus the crack region is expressed as a connected region starting from an edge of the banknote where gray levels of all pixel points are close to 255. If the above connected region exists on the banknote transmission image, whether to reject or receive the banknote can be determined by calculating an edge length and a depth of the connected region and comparing them with the preset threshold. The method is stable and can accurately detect a crack on the banknote and calculate the length and the depth of the crack.

DETAILED DESCRIPTION OF THE EMBODIMENTS

In order to further explain the banknote crack detection apparatus and the banknote crack detection method according to the present disclosure, embodiments will be described in detail with reference to the drawings.

Figure 1:
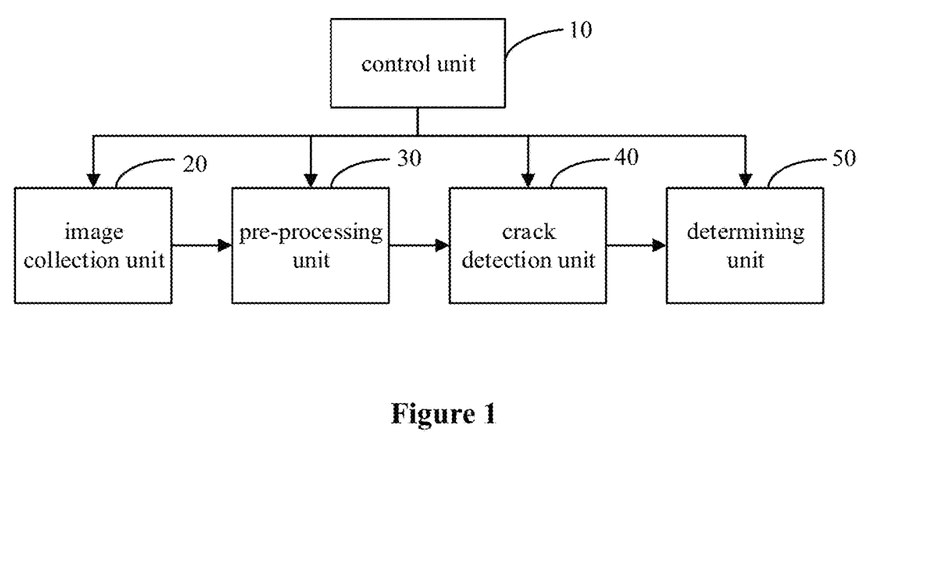
FIG. 1 is a schematic diagram of a logical structure of a banknote crack detection apparatus according to an embodiment of the present disclosure.

As shown in FIG. 1, the banknote crack detection apparatus according to an embodiment of the present disclosure includes: a control unit 10, an image collection unit 20, a pre-processing unit 30, a crack detection unit 40 and a determining unit 50. The image collection unit 20 is configured to collect an optical transmission image of an inputted banknote. The pre-processing unit 30 is configured to receive a banknote image signal collected by the image collection unit 20, and perform foreground region positioning and cutting on the banknote image signal. The crack detection unit 40 is configured to receive a banknote foreground region image from the pre-processing unit 30, and determine whether there is a pixel segment with a crack feature at an edge of a foreground region. If there is the pixel segment with the crack feature, there is a crack at the edge of the foreground region, and the crack detection unit 40 continues to detect whether the crack is extended to a deeper row or column than the edge in the manner of detecting whether there is a crack at an edge, and accumulate a crack edge length and a crack depth. The determining unit 50 is configured to determine whether the inputted banknote is qualified according to a detection result of the crack detection unit. The determining rule is that if there is no crack at any of four edges of the inputted banknote, the inputted banknote is qualified and received; if the inputted banknote has an edge, and the crack edge length is greater than a preset threshold or the crack depth is greater than the preset threshold, the inputted banknote is unqualified and rejected; and if the inputted banknote has an edge, and the crack edge length is less than the preset threshold and the crack depth is less than the preset threshold, the inputted banknote is qualified and received. The control unit 10 is configured to control operation of each of the above units. The pixel segment with the crack feature is an adjacent pixel segment with a certain step in which a gray level of each pixel exceeds a preset gray level threshold, and pixel gray gradients at two end points of the pixel segment both exceed a preset gradient threshold.

Figure 2:
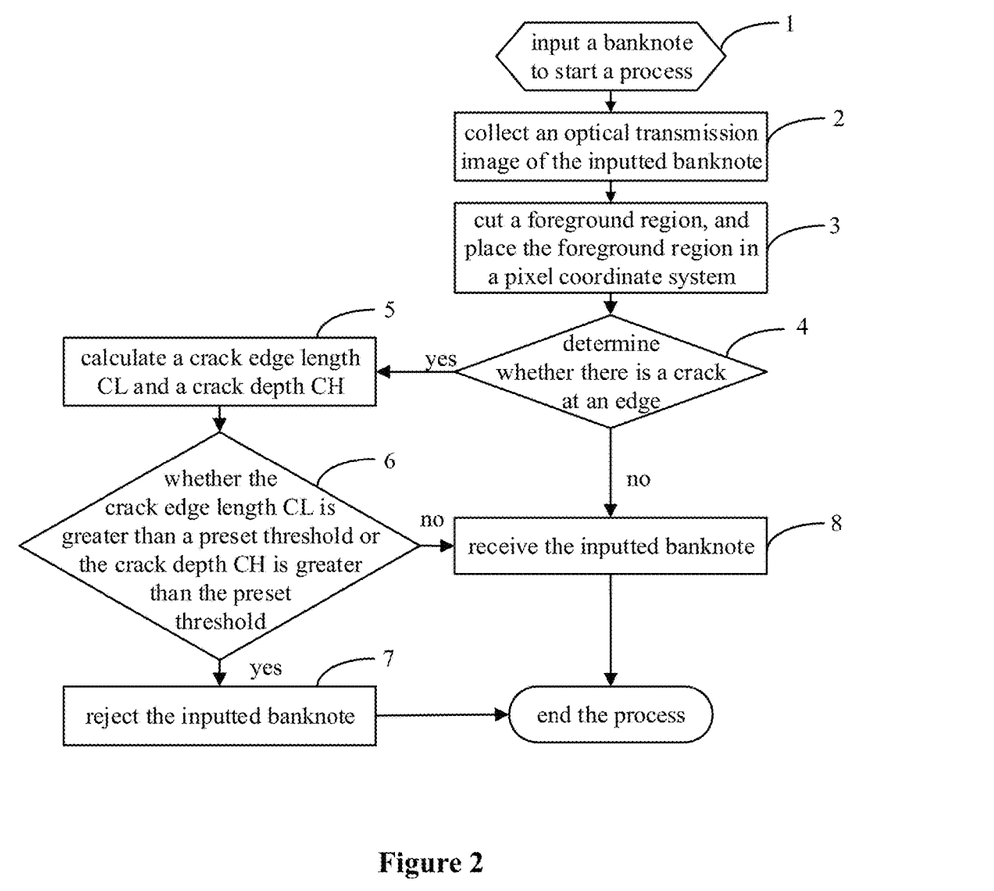
FIG. 2 is a flow chart of a banknote crack detection method according to an embodiment of the present disclosure.

As shown in FIG. 2, the banknote crack detection method according to an embodiment of the present disclosure includes step 1 to step 8. In step 1, a to-be-detected banknote is inputted to start a process. In step 2, an optical transmission image of the inputted banknote is collected. In step 3, a foreground region of the inputted banknote is detected and cut, and then the foreground region is placed in a pixel coordinate system. In step 4, it is determined whether there is a crack at an edge of the foreground region. If there is a crack, step 5 is performed, otherwise, step 8 is performed. In step 5, a crack edge length CL and a crack depth CH are accumulated. In step 6, it is determined whether the crack edge length CL is greater than a preset threshold or the crack depth CH is greater than the preset threshold. If the crack edge length CL is greater than the preset threshold or the crack depth CH is greater than the preset threshold, step 7 is performed, otherwise, step 8 is performed. In step 7, it is determined that the inputted banknote has a crack, the inputted banknote is rejected, and the process ends. In step 8, the inputted banknote is received, and the process ends.

Principles and steps of the banknote crack detection method are described in detail below.

For the process of imaging a banknote through an optional transmission sensor, there is an energy equation as follows:

$$E = E_0 + E_1 + E_2 + \varepsilon \quad \text{(formula 1)}.$$

E denotes energy of light source, $E_0$ denotes energy absorbed by a medium, $E_1$ denotes energy reflected by the medium, $E_2$ denotes energy passing through the medium and is directly reflected by a gray value of a transmission image, and $\varepsilon$ denotes inherent energy loss of the optical transmission imaging system. If a light passes through a crack, then:

$$\begin{cases} E_0 = 0 \\ E_1 = 0 \\ E = E_2 + \varepsilon \end{cases} \quad \text{(formula 2)}.$$

Figure 3:
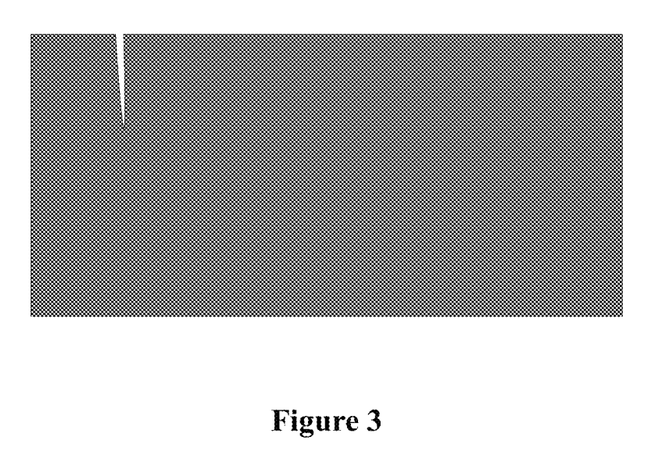
FIG. 3 is an optical transmission image of a banknote having a crack.

It is indicated that, in the crack region, energy passing through the medium increases significantly, which is reflected as that an image gray value in the transmission image is close to 255, the entire banknote crack region is presented as a white connected region with a width of one to two pixels, as shown in FIG. 3. A crack detection scheme of the banknote crack detection apparatus according to the embodiment is to search for such white connected region, and calculate an edge length of the connected region and a depth of the connected region, to determine whether to receive the inputted banknote based on a preset threshold. A specific process of the banknote crack detection method is described in detail below.

1, an initialization setting is performed as follows. A starting edge point of the crack is set as $P_S$, an end edge point of the crack is set as $P_E$, a crack width is set as Cw=0, a crack edge length is set as Cl=0, and a crack depth is set as Ch=0.

Figure 4:
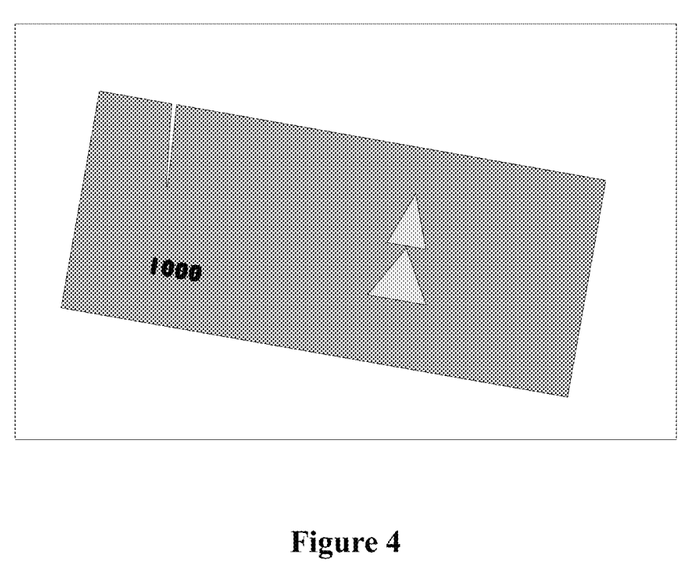
FIG. 4 is an original image collected by an optical sensor.

2, the process starts. A banknote is inputted and an optical transmission image of the banknote is collected. A resolution ratio of an image sensor is set to w dpi. Variables CL and CH are respectively set to represent a crack edge length and a crack depth. The collected banknote transmission image is shown in FIG. 4.

Figure 5:
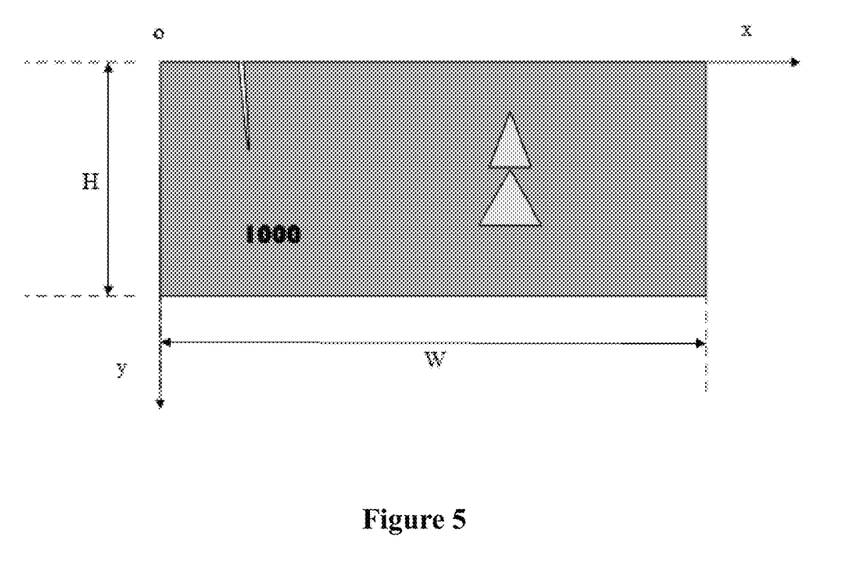
FIG. 5 is a banknote foreground region image placed in a coordinate system.
Figure 6:
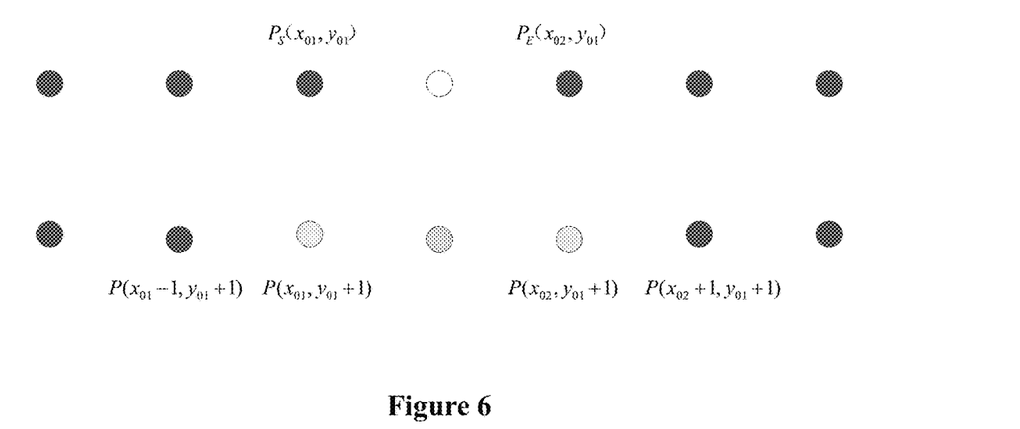
FIG. 6 is a schematic diagram illustrating that a crack width of a previous line is one pixel.
Figure 7:
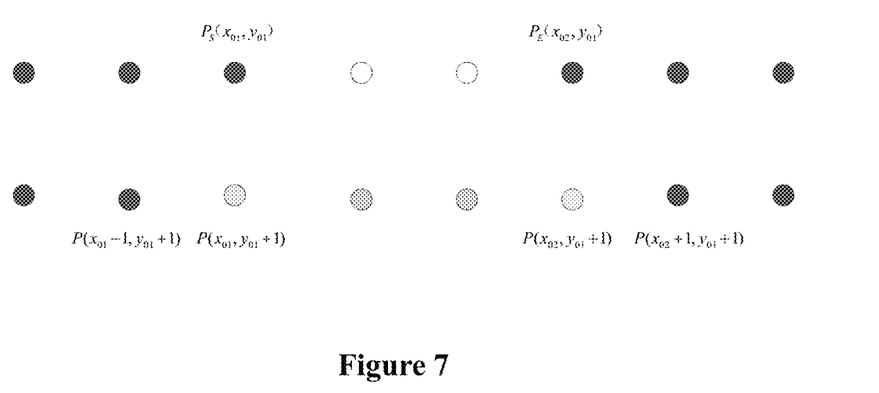
FIG. 7 is a schematic diagram illustrating that a crack width of a previous line is two pixels.

3, Image cutting is performed. Foreground region edges are detected and a foreground region is cut, and then the cut foreground region is placed in a pixel coordinate system xoy. And as shown in FIG. 5, a bottom-left point of the foreground region is located at an ordinate origin of the coordinate system, a height of the foreground region is denoted as H, a width is denoted as W.

4, the crack detection is performed for an upper edge of the foreground region as follows.

(1) A crack starting edge point and a crack end edge point are searched for in pixels of the upper edge of the foreground region. If points $P(x_{01}, y_{01})$ and $P(x_{02}, y_{01})$ meet:

$$\begin{cases} x_{02} - x_{01} - 1 <= 2 \\ GrayP(x_{01}, y_{01}) < gth\ \max \\ GrayP(x_{02}, y_{01}) < gth\ \max \\ GrayP_M > gth\ \min \end{cases} \quad \text{(formula 3)}$$

$P_S = P(x_{01}, y_{01})$, $P_E = P(x_{02}, y_{01})$, CL=Cl+2 and CH=Ch+1 are updated. In the formula 3, $x_{02} - x_{01} - 1 <= 2$ indicates that a width of the crack region on the foreground region image is no more than 2 pixels, gth max denotes a maximum gray value of an optical transmission image when there is no crack in medium, and is generally set to 200, gth min denotes a minimum gray value of a crack region in the optical transmission image, and is generally set to 250, and $P_M$ denotes a point between $P(x_{01}, y_{01})$ and $P(x_{02}, y_{01})$.

(2) If Cw=1, that is there is one pixel point between $P(x_{01}, y_{01})$ and $P(x_{02}, y_{01})$, then $$\begin{cases} x_{02} = x_{01} + 2 \\ GrayP(x_{01} - 1, y_{01} + 1) < gth\ \max \\ GrayP(x_{02} + 1, y_{01} + 1) < gth\ \max \end{cases} \quad \text{(formula 4)}$$

1) If $$\begin{cases} GrayP(x_{01}, y_{01} + 1) > gth\ \min \\ GrayP(x_{01} + 1, y_{01} + 1) < gth\ \max \end{cases} \quad \text{(formula 5)}$$

then for the crack in the line, the starting point of is updated to $P_S = P(x_{01} - 1, y_{01} + 1)$, the end point is updated to $P_E = P(x_{01} + 1, y_{01} + 1)$, the crack edge length is updated to CL=Cl+2, the crack depth is updated to CH=Ch+1, the crack width is updated to Cw=1.

2) If $$\begin{cases} GrayP(x_{02}, y_{01} + 1) > gth\ \min \\ GrayP(x_{01} + 1, y_{01} + 1) < gth\ \max \end{cases} \quad \text{(formula 6)}$$

then for the crack in the line, the starting point is updated to $P_S = P(x_{01} + 1, y_{01} + 1)$, the end point is updated to $P_E = P(x_{02} + 1, y_{01} + 1)$, the crack edge length is updated to CL=Cl+2, the crack depth is updated to CH=Ch+1, the crack width is updated to Cw=1.

3) If $$\begin{cases} GrayP(x_{01}, y_{01}+1) > gth \min \\ GrayP(x_{01}+1, y_{01}+1) > gth \min, \\ GrayP(x_{02}, y_{01}+1) < gth \max \end{cases} \quad \text{(formula 7)}$$

then for the crack in the line, the starting point is updated to $P_S=P(x_{01}-1, y_{01}+1)$, the end point is updated to $P_E=P(x_{02}, y_{01}+1)$, the crack edge length is updated to CL=Cl+2, the crack depth is updated to CH=Ch+1, the crack width is updated to Cw=2.

4) If $$\begin{cases} GrayP(x_{01}, y_{01}+1) > gth \max \\ GrayP(x_{01}+1, y_{01}+1) > gth \min, \\ GrayP(x_{02}, y_{01}+1) < gth \min \end{cases} \quad \text{(formula 8)}$$

then for the crack in the line, the starting point is updated to $P_S=P(x_{01}, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=2.

(3) If Cw=2, that is there are two pixels between $P_S$ and $P_E$, then $$\begin{cases} x_{02} = x_{01}+3 \\ GrayP(x_{01}-1, y_{01}+1) < gth \max. \\ GrayP(x_{02}+1, y_{01}+1) < gth \max \end{cases} \quad \text{(formula 9)}$$

1) If $$\begin{cases} GrayP(x_{01}, y_{01}+1) > gth \min \\ GrayP(x_{01}+1, y_{01}+1) < gth \max \end{cases} \quad \text{(formula 10)}$$

then for the crack in the line, the starting point is updated to $P_S=P(x_{01}-1, y_{01}+1)$, the end point is updated to $P_E=P(x_{01}+1, y_{01}+1)$, the crack edge length is updated to CL=Cl+2, the crack depth is updated to CH=Ch+1, the crack width is updated to Cw=1.

2) If $$\begin{cases} GrayP(x_{01}, y_{01}+1) < gth \max \\ GrayP(x_{01}+1, y_{01}+1) > gth \min, \\ GrayP(x_{02}+2, y_{01}+1) < gth \min \end{cases} \quad \text{(formula 11)}$$

then for the crack in the line, the starting point is updated to $P_S=P(x_{01}, y_{01}+1)$, the end point is updated to $P_E=P(x_{01}+2, y_{01}+1)$, the crack edge length is updated to CL=Cl+2, the crack depth is updated to CH=Ch+1, the crack width is updated to Cw=1.

3) If $$\begin{cases} GrayP(x_{01}+1, y_{01}+1) < gth \max \\ GrayP(x_{01}+2, y_{01}+1) > gth \min, \\ GrayP(x_{01}+3, y_{01}+1) < gth \min \end{cases} \quad \text{(formula 12)}$$

then for the crack in the line, the starting point is updated to $P_S=P(x_{01}+1, y_{01}+1)$, the end point is updated to $P_E=P(x_{01}+3, y_{01}+1)$, the crack edge length is updated to CL=Cl+2, the crack depth is updated to CH=Ch+1, the crack width is updated to Cw=1.

4) If $$\begin{cases} GrayP(x_{01}+2, y_{01}+1) < gth \max \\ GrayP(x_{02}, y_{01}+1) > gth \min \end{cases} \quad \text{(formula 13)}$$

then for the crack in the line, the starting point is updated to $P_S=P(x_{01}+2, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=1.

5) If $$\begin{cases} GrayP(x_{01}, y_{01}+1) > gth \min \\ GrayP(x_{01}+1, y_{01}+1) > gth \min, \\ GrayP(x_{01}+2, y_{01}+1) < gth \max \end{cases} \quad \text{(formula 14)}$$

then for the crack in the line, the starting point is updated to $P_S=P(x_{01}-1, y_{01}+1)$, the end point is updated to $P_E=P(x_{01}+2, y_{01}+1)$, the crack edge length is updated to CL=Cl+2, the crack depth is updated to CH=Ch+1, the crack width is updated to Cw=2.

6) If $$\begin{cases} GrayP(x_{01}, y_{01}+1) < gth \max \\ GrayP(x_{01}+1, y_{01}+1) > gth \min \\ GrayP(x_{01}+2, y_{01}+1) > gth \min \\ GrayP(x_{01}+3, y_{01}+1) < gth \max \end{cases} \quad \text{(formula 15)}$$

then for the crack in the line, the starting point is updated to $P_S=P(x_{01}, y_{01}+1)$, the end point is updated to $P_E=P(x_{01}+3, y_{01}+1)$, the crack edge length is updated to CL=Cl+2, the crack depth is updated to CH=Ch+1, the crack width is updated to Cw=2.

7) If $$\begin{cases} GrayP(x_{01}+1, y_{01}+1) < gth \max \\ GrayP(x_{01}+2, y_{01}+1) > gth \min, \\ GrayP(x_{01}+3, y_{01}+1) > gth \min \end{cases} \quad \text{(formula 16)}$$

then for the crack in the line, the starting point is updated to $P_S=P(x_{01}+1, y_{01}+1)$, the end point is updated to $P_E=P(x_{02}+1, y_{01}+1)$, the crack edge length is updated to CL=Cl+2, the crack depth is updated to CH=Ch+1, the crack width is updated to Cw=2.

In other cases, it is determined that the crack does not extend to the line and the crack detection ends.

(4) An iterative computation is performed. If Cw=1, step (2) is performed repeatedly, and if Cw=2, step (3) is performed repeatedly, until a complete detection for a crack is finished.

If CH>CHth or CL>CLth, that is CH is greater than a preset depth threshold, or CL is greater than a preset length threshold, the inputted banknote is rejected, otherwise, the inputted banknote is received.

For a crack at a left edge, a right edge or a lower edge of the inputted banknote, a similar search method may be performed to detect the crack edge length and width. A final determination is made to receive or reject the inputted banknote, which is described herein.

The banknote crack detection method according to the present disclosure is based on an imaging principle of a banknote optical transmission image. The gray level of the banknote transmission image is closely related to an intensity of a sensor light source and light transmittance of the banknote. In a case that the intensity of the light source is constant, there is a huge difference between a transmittance of a crack region and a transmittance of a non-crack region. Furthermore, image gray levels in the crack region are the same, and thus the crack region is expressed as a connected region starting from an edge of the banknote where gray levels of all pixel points are close to 255. If the above connected region exists on the banknote transmission image, whether to reject or receive the banknote can be determined by calculating an edge length and a depth of the connected region and comparing them with the preset threshold.

The above description is only preferred embodiments of the present disclosure. It should be noted that, the above preferred embodiments should not be understood as a limitation to the present disclosure, and the scope of the present disclosure is defined by the claims of the present disclosure. For the person skilled in the art, several improvements and modifications may be made to the present disclosure without departing from the spirit and scope of the present disclosure, and these improvements and modifications also fall into the scope of the present disclosure.

The invention claimed is:

1. A banknote crack detection method, comprising:
   inputting a to-be-detected banknote;
   collecting an optical transmission image of the inputted banknote;
   detecting a foreground region of the inputted banknote, cutting the foreground region, and placing the foreground region in a pixel coordinate system;
   determining whether there is a crack at an edge of the foreground region;
   when it is determined that there is a crack at an edge of the foreground region, accumulating a crack edge length CL and a crack depth CH;
   determining whether the crack edge length CL is greater than a preset threshold and whether the crack depth CH is greater than the preset threshold,
   determining that the inputted banknote has a crack and rejecting the inputted banknote in a case that the crack edge length CL is greater than the preset threshold or the crack depth CH is greater than the preset threshold; and receiving, the inputted banknote in a case that the crack edge length CL is not greater than the preset threshold and the crack depth CH is not greater than the preset threshold,
   wherein determining whether there is a crack at an edge of the foreground region comprises:
   a first step of performing an initialization setting to set a starting edge point of the crack as $P_S$, an end edge point of the crack as $P_E$, a crack width as Cw=0, the crack edge length as Cl=0, and the crack depth as Ch=0;
   a second step of searching for a crack starting edge point and a crack end edge point in pixels in an edge of the foreground region, and updating $P_S=P(x_{01}, y_{01})$, $P_E=P(x_{02}, y_{01})$, CL=Cl+2 and CH=Ch+1 in a case that points $P(x_{01}, y_{01})$ and $P(x_{02}, y_{01})$ meet:

$$\begin{cases} x_{02} - x_{01} - 1 <= 2 \\ GrayP(x_{01}, y_{01}) < gth \max \\ GrayP(x_{02}, y_{01}) < gth \max \\ GrayP_M > gth \min \end{cases},$$

wherein $P(x_{01}, y_{01})$ indicates a pixel point at a coordinate $(x_{01}, y_{01})$ of the banknote foreground region image, $GrayP(x_{01}, y_{01})$ indicates a gray value of the pixel point at the coordinate $(x_{01}, y_{01})$, $x_{02}-x_{01}-1<=2$ indicates that a width of a crack region on the foreground region image is no more than 2 pixels, gth max denotes a maximum gray value of an optical transmission image when there is no crack in medium, and is generally set to 200, gth min denotes a minimum gray value of a crack region in the optical transmission image, and is generally set to 250, and $P_M$ denotes a point between $P(x_{01}, y_{01})$ and $P(x_{02}, y_{01})$;

a third step of determining that $$\begin{cases} x_{02} = x_{01} + 2 \\ GrayP(x_{01} - 1, y_{01} + 1) < gth \max \\ GrayP(x_{02} + 1, y_{01} + 1) < gth \max \end{cases},$$

when Cw=1, that is there is one pixel point between $P(x_{01}, y_{01})$ and $P(x_{02}, y_{01})$, (1) updating, for the crack in the line, the starting point to $P_S=P(x_{01}-1, y_{01}+1)$, the end point to $P_E=P(x_{01}+1, y_{01}+1)$, the crack edge length to CL=Cl+2, the crack depth to CH=Ch+1, and the crack width to Cw=1, in a case that $$\begin{cases} GrayP(x_{01}, y_{01} + 1) > gth \min \\ GrayP(x_{01} + 1, y_{01} + 1) < gth \max \end{cases};$$

(2) updating, for the crack in the line, the starting point to $P_S=P(x_{01}+1, y_{01}+1)$, the end point to $P_E=P(x_{02}+1, y_{01}+1)$, the crack edge length to CL=Cl+2, the crack depth to CH=Ch+1, and the crack width to Cw=1, in a case that $$\begin{cases} GrayP(x_{02}, y_{01} + 1) > gth \min \\ GrayP(x_{01} + 1, y_{01} + 1) < gth \max \end{cases};$$

(3) updating, for the crack in the line, the starting point to $P_S=P(x_{01}-1, y_{01}+1)$, the end point to $P_E=P(x_{02}, y_{01}+1)$, the crack edge length to CL=Cl+2, the crack depth to CH=Ch+1, and the crack width to Cw=2, in a case that $$\begin{cases} GrayP(x_{01}, y_{01} + 1) > gth \min \\ GrayP(x_{01} + 1, y_{01} + 1) > gth \min; \text{ and} \\ GrayP(x_{02}, y_{01} + 1) < gth \max \end{cases}$$

and (4) updating, for the crack in the line, the starting point to $P_S=P(x_{01}, y_{01}+1)$, the end point to $P_E=P(x_{02}+1, y_{01}+1)$, the crack edge length to CL=Cl+2, the crack depth to CH=Ch+1, and the crack width to Cw=2, in a case that $$\begin{cases} GrayP(x_{01}, y_{01}+1) < gth\ \max \\ GrayP(x_{01}+1, y_{01}+1) > gth\ \min \\ GrayP(x_{02}, y_{01}+1) > gth\ \min \end{cases};$$

a fourth step of determining that $$\begin{cases} x_{02} = x_{01}+3 \\ GrayP(x_{01}-1, y_{01}+1) < gth\ \max \\ GrayP(x_{02}+1, y_{01}+1) < gth\ \max \end{cases},$$

when Cw=2, that is there are two pixels between $P_S$ and $P_E$, (1) updating, for the crack in the line, the starting point to $P_S$=$P(x_{01}-1, y_{01}+1)$, the end point to $P_E$=$P(x_{01}1, y_{01}+1)$, the crack edge length to CL=Cl+2, the crack depth to CH=Ch+1, and the crack width to Cw=1, in a case that $$\begin{cases} GrayP(x_{01}, y_{01}+1) > gth\ \min \\ GrayP(x_{01}+1, y_{01}+1) < gth\ \max \end{cases};$$

(2) updating, for the crack in the line, the starting point to $P_S$=$P(x_{01}, y_{01}+1)$, the end point to $P_E$=$P(x_{01}+2, y_{01}+1)$, the crack edge length to CL=Cl+2, the crack depth to CH=Ch+1, and the crack width to Cw=1, in a case that $$\begin{cases} GrayP(x_{01}, y_{01}+1) < gth\ \max \\ GrayP(x_{01}+1, y_{01}+1) > gth\ \min \\ GrayP(x_{01}+2, y_{01}+1) < gth\ \max \end{cases};$$

(3) updating, for the crack in the line, the starting point to $P_S$=$P(x_{01}+1, y_{01}+1)$, the end point to $P_E$=$P(x_{01}+3, y_{01}+1)$, the crack edge length to CL=Cl+2, the crack depth to CH=Ch+1, and the crack width to Cw=1, in a case that $$\begin{cases} GrayP(x_{01}+1, y_{01}+1) < gth\ \max \\ GrayP(x_{01}+2, y_{01}+1) > gth\ \min \\ GrayP(x_{01}+3, y_{01}+1) < gth\ \max \end{cases};$$

(4) updating, for the crack in the line, the starting point to $P_S$=$P(x_{01}+2, y_{01}+1)$, the end point to $P_E$=$P(x_{02}+1, y_{01}+1)$, the crack edge length to CL=Cl+2, the crack depth to CH=Ch+1, and the crack width to Cw=1, in a case that $$\begin{cases} GrayP(x_{01}+2, y_{01}+1) < gth\ \max \\ GrayP(x_{02}, y_{01}+1) > gth\ \min \end{cases};$$

(5) updating, for the crack in the line, the starting point to $P_S$=$P(x_{01}-1, y_{01}+1)$, the end point to $P_E$=$P(x_{01}+2, y_{01}+1)$, the crack edge length to CL=Cl+2, the crack depth to CH=Ch+1, and the crack width to Cw=2, in a case that $$\begin{cases} GrayP(x_{01}, y_{01}+1) > gth\ \min \\ GrayP(x_{01}+1, y_{01}+1) > gth\ \min \\ GrayP(x_{01}+2, y_{01}+1) < gth\ \max \end{cases};$$

(6) updating, for the crack in the line, the starting point to $P_S$=$P(x_{01}, y_{01}+1)$, the end point to $P_E$=$P(x_{01}+3, y_{01}+1)$, the crack edge length to CL=Cl+2, the crack depth to CH=Ch+1, and the crack width to Cw=2, in a case that $$\begin{cases} GrayP(x_{01}, y_{01}+1) < gth\ \max \\ GrayP(x_{01}+1, y_{01}+1) > gth\ \min \\ GrayP(x_{01}+2, y_{01}+1) > gth\ \min \\ GrayP(x_{01}+3, y_{01}+1) < gth\ \max \end{cases};$$

(7) updating, for the crack in the line, the starting point to $P_S$=$P(x_{01}+1, y_{01}+1)$, the end point to $P_E$=$P(x_{02}+1, y_{01}+1)$, the crack edge length to CL=Cl+2, the crack depth to CH=Ch+1, and the crack width to Cw=2, in a case that $$\begin{cases} GrayP(x_{01}+1, y_{01}+1) < gth\ \max \\ GrayP(x_{01}+2, y_{01}+1) > gth\ \min \\ GrayP(x_{01}+3, y_{01}+1) > gth\ \min \end{cases};$$

and
determining that the crack does not extend to the line in other cases, and ending the crack detection; and
a fifth step of performing an iterative computation, repeatedly performing the third step in a case that Cw=1, and repeatedly performing the fourth step in a case that Cw=2 until a complete detection for a crack is finished.

2. The banknote crack detection method according to claim 1, wherein the determining whether there is a crack at an edge of the foreground region comprises:

sequentially determining, for each of adjacent pixel segments of a step length at upper, lower, left and right edges, whether a gray level of each pixel in the pixel segment exceeds a preset gray level threshold, and whether pixel gray gradients at two end points of each of the pixel segments both exceed a preset gradient threshold; and determining that there is a crack at the edges of the foreground region if the gray level of each pixel in each of the pixel segments exceeds the preset gray level threshold and the pixel gray gradients at two end points of each of the pixel segments both exceed the preset gradient threshold, otherwise, determining that there is no crack at the edges of the foreground region.

* * * * *

UNITED STATES PATENT AND TRADEMARK OFFICE
CERTIFICATE OF CORRECTION

PATENT NO. : 10,319,172 B2  
APPLICATION NO. : 15/543551  
DATED : June 11, 2019  
INVENTOR(S) : Yuanchao Yu et al.

Page 1 of 1

It is certified that error appears in the above-identified patent and that said Letters Patent is hereby corrected as shown below:

In the Claims

At Column 11, Claim 1, Line 53, please delete the "," after "receiving".

At Column 13, Claim 1, Line 17, please replace --$P_E = P(x_{01}1, y_{01} + 1)$-- with "$P_E = P(x_{01} + 1, y_{01} + 1)$".

Signed and Sealed this  
Third Day of September, 2019

Andrei Iancu  
*Director of the United States Patent and Trademark Office*